No. 778,777. PATENTED DEC. 27, 1904.
J. W. GATES.
ANIMAL TRAP.
APPLICATION FILED MAR. 15, 1904.

Witnesses
Edmund J. Strauser
A. P. Knight

Inventor
John W. Gates
by Townsend Bros
his Attorneys

No. 778,777.

Patented December 27, 1904.

UNITED STATES PATENT OFFICE.

JOHN W. GATES, OF LOS ANGELES, CALIFORNIA.

ANIMAL-TRAP.

SPECIFICATION forming part of Letters Patent No. 778,777, dated December 27, 1904.

Application filed March 15, 1904. Serial No. 198,193.

*To all whom it may concern:*

Be it known that I, JOHN W. GATES, a citizen of the United States, residing at Los Angeles, in the county of Los Angeles and State of California, have invented a new and useful Improvement in Animal-Traps, of which the following is a specification.

This invention relates to the class of animal-traps wherein two spring-connected members are adapted to be held apart by trip means, upon the release of which said members spring together to catch the animal, said trip means being so located that the animal will penetrate between said members to contact with the trip means.

The primary object of the present invention is to provide improved trip means which may be set quickly and with a minimum of trouble and which when set will be secure from accidental displacement.

A further object of the invention is to so construct the trip means that its sensitiveness for release can be varied as desired.

Another object of the invention is to so construct and support the trip means on a member of the trap that it may be shifted or adjusted, if desired, to vary the capacity or opening of the trap-jaws.

To this end the invention comprises a trip means supported on a bracket having eye means slidable on such trap member or capable of being fastened thereto, as may be desired.

The accompanying drawings illustrate the invention.

Figure 1:
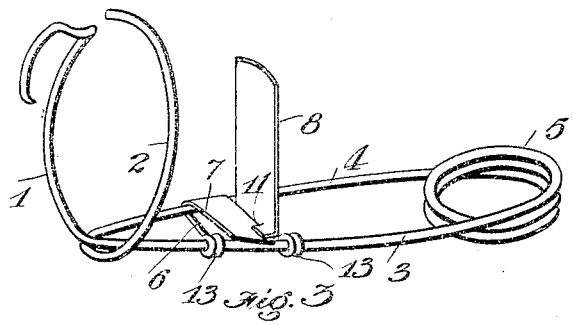
Figure 3:
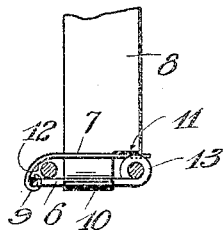
Figure 2:
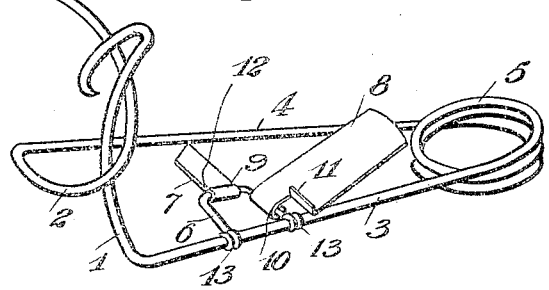
Figure 4:
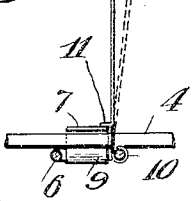

Figure 1 is a perspective of the trap in set or open position. Fig. 2 is a similar view of the trap in released or closed position. Fig. 3 is a transverse section of the trap in set position in the plane of the trip device and directly in front of the latch thereof. Fig. 4 is a section transverse to Fig. 3 and taken at the outer side of the trip-plate.

1 2 designate two jaw members at the ends of the respective arms 3 4, which are connected by spring or resilient means 5, which tend to move the jaw members to the position shown in Fig. 2. All of the said parts are desirably formed of a continuous piece of stiff steel wire bent to form the jaws 1 2, arms 3 4, and connecting spring-coil 5.

The trip device comprises a supporting yoke or bracket 6, attached or connected to one of the arms—say the arm 3—a latch 7, pivoted on said yoke or bracket and adapted to engage over the other arm, and a locking member 8, also pivoted on said yoke or bracket and adapted to engage said latch to retain it in set position.

The yoke or bracket 6 is desirably a U-shaped member formed of wire, with its ends bent around the arm 3 to retain the yoke in place. One of the sides of this U-shaped yoke serves as a pivot for the locking member 8, while the outer portion or part connecting the two sides of said yoke serves as a pivot for the latch member 7. Said latch member may consist of a strip of sheet metal having one end bent to form an eye 9, embracing said outer part of the U-shaped yoke. Similarly, the locking device 8 may be formed as a plate whose inner end is bent to form an eye 10, embracing one side of said U-shaped yoke, said inner end of the plate also having a lateral flange or projection 11, adapted to engage over the top of the latch 7 to hold the same in set position. When in set position, the member 8 extends substantially vertical and opposite the space between the jaw members 1 2.

The latch member near its pivot has a curved, inclined, or cam portion 12, which when the latch is in set position engages over the arm 4 in such manner that the pressure of said arm due to the resiliency of the spring 5 tends to turn the latch member 7 upwardly, so that its outer end presses upwardly against the detent projection 11. To produce this result, it is necessary that the bearing of the latch member against said arm 4 should be above the plane of movement of said arm 4 under the action of said spring.

To set the trap, the arms 3 4 are squeezed together, so as to open or separate the jaws 1 2, care being taken that in this approach of the arms 3 4 the latch member 7 passes beneath the arm 4. Then said latch member is turned over and down upon the arm 4, bringing the free end of said latch member down upon the other arm, 3, whereupon the locking-plate 8 is moved to bring its projection or flange 11 over the top of said latch member 7, holding the latter firmly in place and locking the whole device against movement. The trap may now be applied in the burrow of an animal in the usual manner, and when the gopher or other animal projects its head between the jaw members 1 and 2 and against the trip member 8 the latter will be moved backward, releasing its projection 11 from the latch member 8, and said latch member will then be thrown upward by the force of the spring 5, allowing the arms 3 4 to be violently separated by the action of said spring, bringing the jaw members 1 2 together to catch or entrap the animal. It will be seen that by moving the detent or locking plate 8 more or less from its vertical position, as indicated in dotted lines in Fig. 4, it may be brought as near as desired to the releasing-point, so that the sensitiveness of release of the trip device can be adjusted to suit special conditions.

The bracket or support member 6 may be secured in fixed position on the arm 3 by means of solder or otherwise, or, if desired, it can be left with the eyes 13 at the ends of the yoke free to slide upon said arm, so as to adjust the position of the bracket, yoke, or support along the arm 3 to vary the capacity of the trap as desired. Thus by moving the support near the inner or spring end of the trap the jaws are forced farther apart on setting the trap to adapt it to use in a large burrow, while on moving the support or trip device outward toward the jaw-carrying end of the arms the trap when set is adapted for insertion into a small burrow or hole.

What I claim is—

1. An animal-trap comprising two spring-connected jaw-carrying arms, a latch member pivotally connected to one of said arms, and having a portion engaging the other of said arms to hold the latter in set position, and a pivoted detent member having a portion engaging said latch member to hold it in set position and also having an operating portion extending, in the set position thereof, opposite the space between the jaws of the trap.

2. An animal-trap comprising two spring-connected jaw-carrying members, a support attached to one of said members, a latch pivoted on said support to extend over the other member in set position, and a detent device pivoted on said support and having a projection to extend over said latch in set position and also having an operating portion.

3. An animal-trap comprising two spring-connected jaw-carrying members, a U-shaped wire yoke attached by its ends to one of said members, a latch-plate pivoted on the outer end of said yoke and adapted to extend over the other member in set position, and a detent-plate pivoted on a side of said yoke and having a projection to extend over said latch in set position, said detent-plate adapted to extend upwardly in set position and act as a trip device.

4. An animal-trap comprising two spring-connected jaw-carrying members, a support having eye means engaging and slidable on one of said members, a latch pivoted on said support to extend over the other member in set position, and a detent device pivoted on said support and having a projection to extend over said latch in set position and also having an operating portion.

5. An animal-trap comprising two jaw-carrying spring-connected members tending to spring away from one another to close the jaws and a trip device for same consisting of a latch pivotally connected to one of said members and adapted to extend over the other of said members to hold the members from springing away from one another, and a movable detent having a portion engaging with said latch and an operating portion.

In testimony whereof I have signed my name to this specification, in the presence of two subscribing witnesses, at Los Angeles, in the county of Los Angeles and State of California, this 4th day of March, 1904.

JOHN W. GATES.

In presence of—
ARTHUR P. KNIGHT,
JULIA TOWNSEND.